Dec. 2, 1952      E. H. LEHMAN      2,620,178
FRICTION SHOCK ABSORBER FOR RAILWAY CAR TRUCK SPRINGS
Filed March 30, 1949
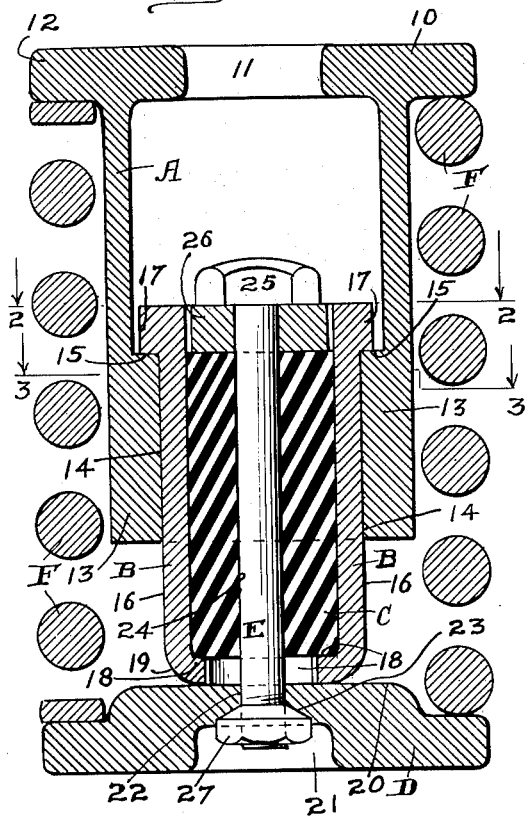
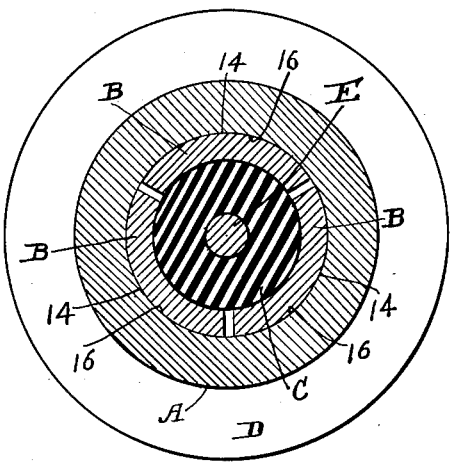
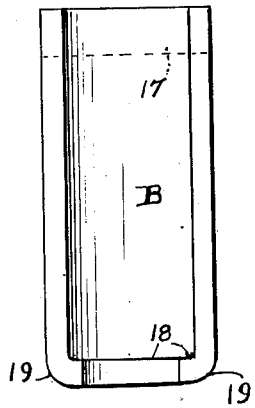
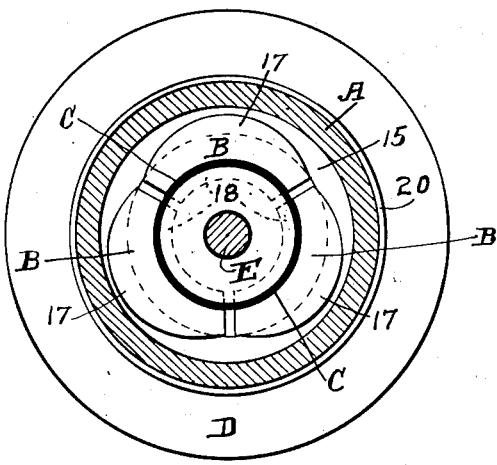
Inventor:
Edward H. Lehman.
By Henry Fuchs.
Atty.

Patented Dec. 2, 1952

2,620,178

UNITED STATES PATENT OFFICE 2,620,178

FRICTION SHOCK ABSORBER FOR RAILWAY
CAR TRUCK SPRINGS

Edward H. Lehman, Chicago, Ill., assignor to
W. H. Miner, Inc., Chicago, Ill., a corporation
of Delaware Application March 30, 1949, Serial No. 84,448

3 Claims. (Cl. 267—9)

1

This invention relates to improvements in friction shock absorbing mechanisms especially adapted for use as snubbing devices in connection with the springs of railway car trucks.

One object of the invention is to provide a simple and efficient snubber for truck springs of railway cars, including relatively movable, interengaged, lengthwise slidable friction elements disposed between and cooperating with the top and bottom spring follower plates of the truck springs, wherein one of said elements is flexible to compensate for lateral and angular displacement of the follower plates with respect to each other without disturbing true frictional contact between the friction elements.

A further object of the invention is to provide a friction shock absorber for snubbing the action of railway car truck springs, comprising a friction casing adapted to bear on one of the spring follower plates of the truck springs, friction shoes slidingly engaged within the casing and carried on a follower bearing on the other spring follower plate of the cluster of springs, and flexible means for connecting said shoes to the follower to permit relative lateral displacement and angular tilting of the follower with respect to the other parts of the mechanism to compensate for relative lateral and angular displacement of the follower plates of the spring cluster with respect to each other, without disturbing proper alignment of the shoes and casing.

A more specific object of the invention is to provide a friction shock absorber including a friction casing, a plurality of friction shoes slidingly telescoped within the casing, a follower movable toward and away from the casing and supporting the shoes, a rubber core under lateral compression between the shoes, and a bolt anchoring the rubber core to the follower, the bolt extending through the core and having its upper end shouldered on a washer bearing on top of the rubber core, thereby providing a flexible connection between the shoes and the follower to compensate for lateral and angular displacement of the follower with respect to the friction casing.

Other objects of the invention will more clearly appear from the description and claims hereinafter following.

In the accompanying drawing forming a part of this specification, Figure 1 is a transverse, vertical sectional view of my improved shock absorber. Figures 2 and 3 are horizontal sectional views, corresponding respectively to the lines 2—2 and 3—3 of Figure 1. Figure 4 is an elevational view of one of the friction shoes of the improved shock absorber, looking at the inner side of the shoe.

My improved shock absorber, as shown in the drawing, comprises broadly a friction casing A, three friction shoes B—B—B slidingly telescoped within the casing, a rubber core C under lateral compression between the shoes, a follower D on which the shoes are supported, a retainer bolt E anchoring the rubber core and shoes to the follower, and a spring F opposing relative movement of the casing A and the follower D toward each other.

The friction casing A is in the form of a substantially cylindrical, tubular member, open at its inner or bottom end and having a transverse end wall 10 at its outer or upper end, said wall being provided with a central opening 11. The wall 10 projects outwardly beyond the body portion proper of the casing, providing a laterally projecting, annular flange 12, which forms an abutment or follower member for the upper end of the spring F. The wall of the casing A is inwardly thickened at its lower or inner end, as indicated at 13, thereby providing interior, transversely curved, lengthwise extending friction surfaces 14—14—14, and a horizontal, annular retaining shoulder 15 at the inner ends of said friction surfaces.

The friction shoes B—B—B are of similar design and arranged in annular series within the casing A, each shoe being in the form of a relatively heavy, transversely curved plate, presenting a transversely curved, lengthwise extending friction surface 16 on its outer side, corresponding in curvature to the interior friction surface 14 of the casing A and slidably engaging the same. At the upper end, each shoe has a laterally outwardly projecting flange 17, adapted to engage in back of the retaining shoulder 15 of the casing to limit movement of the shoe outwardly of the casing. The outer edges of the flanges 17—17—17 are eccentric to the friction surface sides of the shoes, as shown most clearly in Figure 2, to facilitate assembling of the shoes with the casing.

At the lower end, each shoe B is provided with an inturned lateral flange 18 adapted to support the rubber core C. The lower ends of the shoes are preferably rounded off, as indicated at 19, to facilitate rocking of the shoes on the follower D.

The follower D is in the form of a relatively thick, disc-like plate, having an upstanding central boss 20 thereon upon which the lower ends of the shoes B—B—B rest. The follower D is provided with a downwardly opening, central seat 21, adapted to accommodate the usual spring centering projection of the bottom spring follower plate of a cluster of truck springs. The follower D is further provided with a central opening 22 therethrough, adapted to accommodate the bolt E, the opening 22 communicating with the seat 21 and being countersunk at its lower end, as indicated at 23, said countersunk portion being preferably of tapered formation, as shown.

The rubber core C is in the form of a cylindrical plug, interposed between the shoes B—B—B, the same being under compression between the shoes to hold the same expanded and in tight contact with the friction surfaces of the casing. The core C rests on the bottom flanges 18—18—18 of the shoes B—B—B and is anchored to the follower D by the retainer bolt E, the shank of which extends through an axial bore 24 in the core C. The bolt E has a relatively large head 25 at its upper end bearing on a heavy disclike washer 26 interposed between the top end of the rubber core C and the head 25 on the bolt. The bolt E has a nut 27 threaded on its lower end, the nut being seated in the countersunk portion 23 of the opening 22 and being of conical formation to fit the tapered formation of said countersunk portion. As will be seen upon reference to Figures 1 and 2, the washer 26 is of somewhat smaller outside diameter than the diameter of the opening between the shoes B—B—B to provide sufficient clearance for relative radial displacement of the washer with respect to the shoes and lateral and angular displacement of the bolt E with respect to the shoes.

The spring F is in the form of a helical coil surrounding the casing A and having its top and bottom ends bearing, respectively, on the flange 12 of the casing and on the follower D.

In assembling my improved shock absorber, the casing A is placed upon a suitable support in inverted position, that is, with the end wall 10 of said casing lowermost and resting on the support. The shoes B—B—B, with the rubber core therebetween, are then telescoped within the casing A, the annular series of shoes being contracted to permit the flanges 17—17—17 to pass through the opening of the casing defined by the friction surfaces 14—14—14 and then be engaged in back of the retaining shoulder 15 of the casing. The three shoes are pushed into the casing in succession, the clearance between the outer edges of adjacent shoes being sufficient to permit contraction of the series of shoes to an extent to allow the flange of the last shoe to be applied to pass through the opening between the surfaces 14—14—14. The spring F is then placed in position about the casing A with its end resting on the flange 12 of said casing. The follower D is next placed on top of the spring F. The parts are then righted, and the bolt E and the washer 26 placed in position, these parts being entered through the opening 11 of the wall 10 at the top end of the casing A. The nut 27 is then applied to the bolt and drawn tight so as to expand the core C and press the shoes B—B—B against the friction surfaces of the casing A.

As it will be understood by those skilled in this art, my improved shock absorber is substituted for one of the spring coils, or sets of coils, of a cluster of truck springs of a railway car and cooperates with the top and bottom spring follower plates of the spring cluster, with the usual spring centering projections of said top and bottom follower plates engaged, respectively, in the opening 11 of the top wall 10 of the casing A and the seat 21 of the follower D. As will be evident, the snubbing device is compressible between the body and truck bolsters of the car, together with the usual cluster of springs.

In the operation of my improved shock absorber, upon the springs of the cluster of the truck of a railway car being compressed, the friction shoes B—B—B will be forced inwardly of the friction casing A, opposed by the spring F. Due to the friction existing between the friction shoes and the friction surfaces of the casing, relative movement of the parts is opposed and the action of the springs of the cluster effectively snubbed. Further, any displacement of the follower D with respect to the friction casing A, due to relative displacement laterally and angularly of the spring follower plates of the spring cluster, is compensated for by flexing of the shoes with respect to the follower D, this being permitted primarily by the yielding nature of the rubber core C, which permits lateral displacement and angling of the bolt E with respect to the shoes B—B—B, and secondarily by the rocking action of the shoes B—B—B on the follower D and the swiveling action of the nut 27 of the bolt in the countersunk opening 23 of said follower.

I claim:

1. In a friction shock absorber, the combination with a casing having lengthwise extending, interior friction surfaces; of friction shoes having their inner ends slidingly telescoped within the casing; a follower engaging the outer ends of said shoes, said casing and follower being relatively movable toward and away from each other; a rubber core under compression between said shoes; a retainer bolt anchoring said core to said follower; bottom flanges on said shoes supporting said core; a head at the upper end of said bolt; a washer interposed between the head of said bolt and the upper end of said core and bearing on the latter; and a spring surrounding said casing and yieldingly opposing movement of said follower and casing toward each other.

2. In a friction shock absorber, the combination with a casing having lengthwise extending, interior friction surfaces; of friction shoes having their inner ends slidingly telescoped within the casing; a follower engaging the outer ends of said shoes, said casing and follower being relatively movable toward and away from each other, said shoes having their outer ends arranged to rock on said follower; a rubber core under compression between said shoes; a retainer bolt anchoring said core to said follower; bottom flanges on said shoes supporting said core; a head at the upper end of said bolt; a washer interposed between the head of said bolt and the upper end of said core and bearing on the latter; and a spring surrounding said casing and yieldingly opposing movement of said follower and casing toward each other.

3. In a friction shock absorber, the combination with a casing having lengthwise extending, interior friction surfaces; of friction shoes having their inner ends slidingly telescoped within the casing; a follower engaging the outer ends of said shoes, said casing and follower being relatively movable toward and away from each other; a rubber core under compression between said shoes; a retainer bolt anchoring said core to said follower; bottom flanges on said shoes supporting said core; a head at the upper end of said bolt; a washer interposed between the head of said bolt and the upper end of said core and bearing on the latter, said washer being of smaller outside diameter than the diameter of the opening between said shoes; and a spring surrounding said casing and yieldingly opposing movement of said follower and casing toward each other.

EDWARD H. LEHMAN.

REFERENCES CITED

The following references are of record in the file of this patent:

UNITED STATES PATENTS

| Number | Name | Date |
|---|---|---|
| 1,985,369 | Fuchs | Dec. 25, 1934 |
| 2,216,231 | Dentler | Oct. 1, 1940 |
| 2,286,845 | Cottrell et al. | June 16, 1942 |
| 2,479,863 | Pierce | Aug. 23, 1949 |
| 2,484,750 | Schlegel | Oct. 11, 1949 |

FOREIGN PATENTS

| Number | Country | Date |
|---|---|---|
| 620,246 | France | Jan. 15, 1927 |